3 50-276 CROSS REFERENCE SEARCH ROOM
250/214
X2578

Nov. 10, 1959 A. F. DEUTH 2,912,593

LIGHT RESPONSIVE CONTROL DEVICE

Filed March 19, 1957

INVENTOR.
ALBERT F. DEUTH
BY J. B. Burke
ATTORNEY 2,912,593

LIGHT RESPONSIVE CONTROL DEVICE

Albert F. Deuth, Hartsdale, N.Y., assignor to Clairex Corporation, New York, N.Y., a corporation of New York Application March 19, 1957, Serial No. 647,111

10 Claims. (Cl. 250—214)

This invention concerns an automatic light responsive control system, and is particularly directed to a photoelectrically operated system useful for dimming a first vehicle's headlights responsive to receipt of a light beam from the headlights or tallights of a second vehicle. The system may also be used to actuate a warning signal, operate an anti-glare device, or activate any other desired load, light or signal device upon approach of a vehicle carrying the system to a light source or upon approach of a light source to the system.

Various systems of the general type mentioned have been proposed for use in automobiles, trucks, and the like. These systems have all been confronted with one difficulty which has hitherto remained unsolved. This has been the necessity for the system to respond to a very weak light beam of approximately 0.0001 foot candle emitted by light sources located several hundred to a thousand feet distant. Attempts have been made to provide some optical gain by using a collecting lens and focusing the lens on the sensitive area of a photoelectric cell. Unfortunately, the incident light beam provided by the approaching vehicle is a moving one so that the focused light beam moved off the sensitive area as the angle of incidence of light from the distant vehicle changed.

This inherent difficulty has been avoided in the present invention by providing an optical arrangement which keeps the focused light beam in the sensitive field of the photoelectric cell as the angle of incidence changes between predetermined light acceptance angles. The present system employs a photoelectric cell of the cadmium sulphide, cadmium selenide, or equivalent type. This type of photoelectric cell includes a photosensitive crystalline element whose electrical conductivity changes as a function of the amount of light cast thereon. The sensitive area of the photoelectric cell is substantially rectangular and is about 3/16 of an inch long by approximately 3/64 of an inch wide. The system provides a horizontal response or light acceptance angle of about ten to fifteen degrees, and a vertical response or light acceptance angle of about five degrees. A double convex spherical lens is used in association with a semi-cylindrical lens to cast a linear light image on the sensitive area of the photoelectric cell. This linear light image moves over the area as the vertical and horizontal incidence angles change without leaving the area. The sensitive area is substantially a rectangle with the light image in the form of a narrow slit-like line disposed at right angles to the length of the photosensitive rectangular area. Adjusting means is provided in the system for presetting the vertical angle of light acceptance and may be provided for the horizontal angle of light acceptance. Provision is further made for rotating the photosensitive area and image line to obtain horizontal and vertical positions for the area and line respectively. The ratio of horizontal to vertical response may also be fixed by further adjustment means.

Included in the system is an electronic circuit which compensates for the time constant characteristic of the particular photosensitive element employed. Prior known light responsive control systems employing photoconductive cells have generally failed to provide for the speed of response requirements of the system. Inadequate provision was also made for the variable frequency response characteristics of the photoelectric cell. These considerations are all adequately dealt with in the present system.

It is therefore a principal object of the invention to provide an automatic light responsive control system for a suitable load device, the system having predetermined horizontal and vertical light acceptance angles.

It is a further object to provide an optical arrangement for a light responsive control system, wherein a light image is cast as movable vertical line on a photosensitive area of a photoelectric cell.

It is a further object to provide an optical arrangement for a system, as described wherein an appropriate optical geometry exists to obtain selected horizontal and vertical acceptance angles for light derived from a remote source.

It is a further object to provide an optical arrangement for a light responsive control system, including a substantial rectangular photosensitive area and a perpendicularly disposed slit-like linear light image and including means for rotating the area and image on horizontal axes.

It is a further object to provide means for adjusting the ratio of horizontal to vertical response of a photoelectric control system.

It is a further object to provide a light responsive photoelectric control system with electronic means for compensating for the time constant characteristics and frequency response characteristics of a photoelectric cell used therein.

It is a further object to provide a control system for lamps or other load device, the system being responsive to receipt of light from headlights or taillights of a vehicle located less than a thousand feet from the system. It is a further object to provide an automatic headlight dimmer system for a vehicle.

Other and further objects and advantages of the invention will become apparent from the following detailed description taken together with the drawing wherein.

Figures 1, 2, 3, 4, 5, 6, 8:
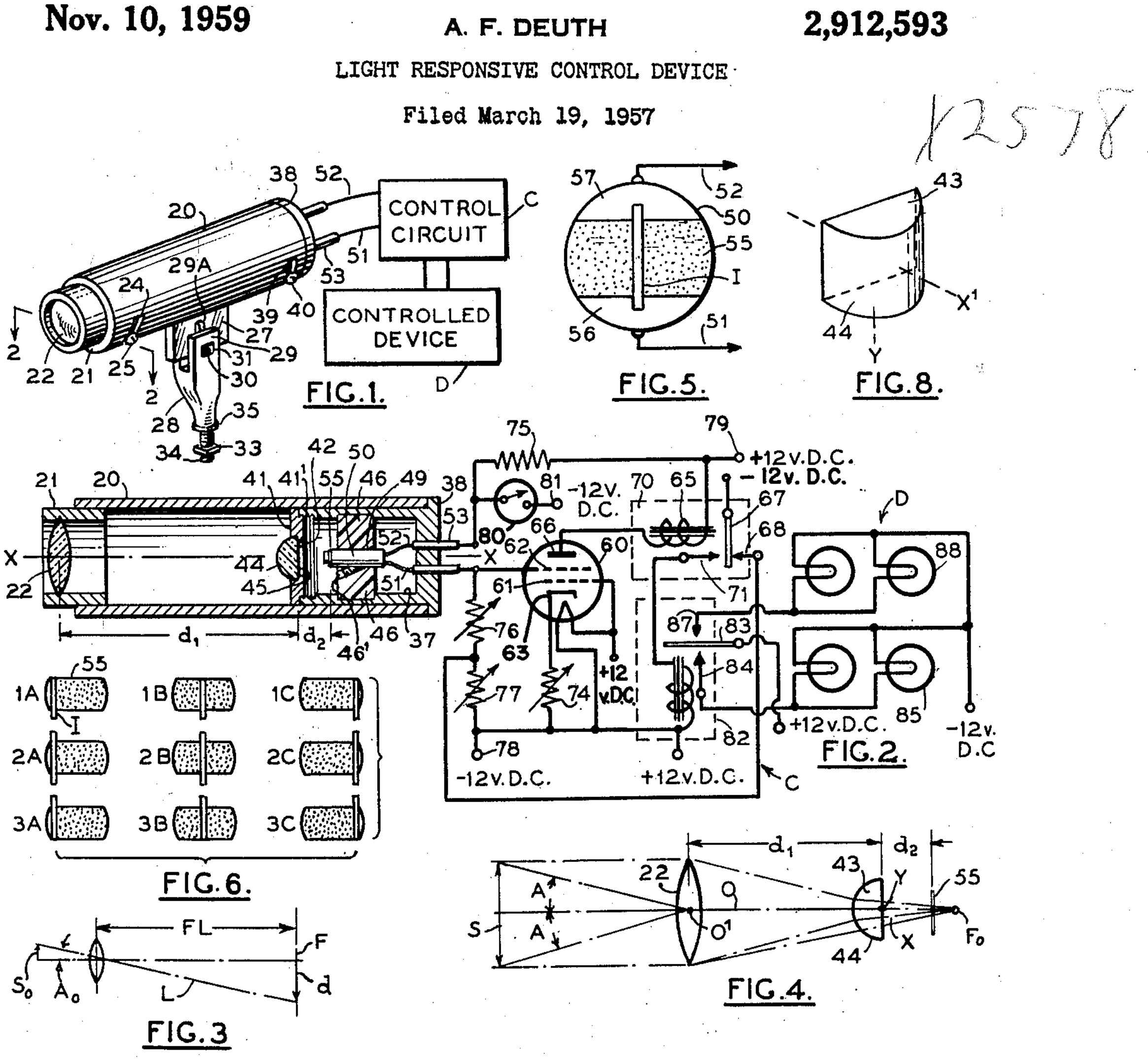
Fig. 1 is a perspective view of an optical assembly unit embodying the invention.
Fig. 2 is a horizontal or plan sectional view taken on lines 2—2 of Fig. 1 and including a diagram of an electronic circuit usable with the optical assembly unit in an automatic vehicle headlight control system.
Figs. 3, 4 and 6 are optical diagrams useful in explaining the invention.
Fig. 5 is an end view on an enlarged scale of a photoelectric cell used in the system according to the invention.
Fig. 8 is a perspective view of a cylindrical lens employed in the system.

Referring to Figs. 1 and 2, there is shown a cylindrical tube 20 having an open end in which is adjustably disposed a cylindrical lens barrel 21. A double convex lens is mounted in the barrel 21. The tube 20 is provided with a slot 24 extending helically a portion of a turn around the tube. A set screw 25 passes through the slot and is threaded in the barrel. By means of this screw and slot the barrel can be longitudinally positioned in the tube to set the lens at a desired point therein. A depending bar mount 27 is located at the underside of the tube 20. A yoke 28 having slightly flexible arms 29 straddles the bar 27. Bolt 30 passes through the arms 29 and bar 27 is secured by nut 31. The nut can be loosened so that the tube is adjustable on the axis of bolt 30. When the nut is tightened, the tube will then be rigidly fixed in position on a horizontal axis.

The tube 20 with yoke 28 is adjustable on a vertical axis by means of nut 33 which is threaded on the vertically threaded post 34 in which the yoke terminates at its lower end. The tube can be mounted on the cowl, dashboard, rear view mirror, or other suitable part of a vehicle body. Post 34 may be inserted through a hole in the desired mounting surface and the nut 33 will be tightened against the underside of the mounting surface. The yoke is provided with a shoulder or seat 35 which will abut the upper surface of the mounting surface. Adjustably disposed in the other open end of tube 20 is a cylindrical support member 37 which has a closed flanged end 38. The flange may be knurled or milled if desired to facilitate angular rotational adjustment. A slot 39 is provided in the tube 20 near the end of the tube and a set screw 40 is inserted through the slot into the member 37. By loosening the screw the angular position of the member 37 can be adjusted. In its inner end, the member 37 supports a flat circular disk 41 which has a rectangular aperture 42. The disk has a threaded shoulder 41' engaged in the threaded end of support 37. In aperture 42 is supported a partially cylindrical lens 44. This lens has flat semicircular faces 43 which may be located substantially horizontal and a rectangular side 45 which will then be vertical. The shape of the lens is shown best in Fig. 8. This provides a uniplanar light converging element in the system.

The lens has its optic axis X' and geometric axis Y disposed perpendicular to each other. Another disk 46 is mounted in member 37. This circular disk has an aperture 49 extending axially therein. Adjustably disposed in this aperture is a cylindrical photocell 50. The optical axes of lenses 22 and 44 are disposed in alignment with each other and with the axes of tube 20, barrel 21, and cylindrical member 37, on line X—X. The photocell terminates in a pair of conductors or leads 51, 52. Insulation sleeves 53 may be provided for these leads. The leads extend through apertures in the flanged end 38 of member 37 where they are connected to a suitable control circuit or device C.

The optical arrangement used in the system will be explained with reference to Figs. 3–6. Photocell 50 may be of a known photoconductive type employing crystalline cadmium sulphide, cadmium selenide, or the like in the form of a photosensitive layer 55 which is preferably more highly sensitive to incident red wavelengths of light. The layer may be located on a side of the photocell body or on the inner end of the crystal body. Spaced electrodes 56, 57 overlay the crystal and are electrically connected to leads 51, 52 respectively. This photocell is of the photoconductive type which changes its electrical resistance depending on the amount of light illuminating the photosensitive area exposed between the electrodes. The substantially rectangular surface of layer 55 exposed between the electrodes has an area which may be approximately $\frac{3}{16}$ of an inch long by $\frac{5}{64}$ of an inch wide. The long dimension should be disposed horizontally and the narrow dimension should be vertical. The plane of the photosensitive layer is substantially vertical.

The optical system should provide a horizontal response or horizontal light acceptance angle of ten to fifteen degrees and a vertical response or vertical light acceptance angle of approximately five degrees. The acceptance angles in vertical and horizontal directions are the maximum angles in vertical and horizontal planes respectively to which it is desired that the system be responsive. These angles are defined in vertical and horizontal planes by the optic axis O of lens 22 and line of travel L of light from a remote source S such as a headlight or taillight of another vehicle. Angle A in Fig. 4 is such an acceptance angle taken in either a vertical or horizontal plane. Since the system must respond to a very weak light of approximately 0.0001 foot candle, lens 22 is used as a collecting lens to provide some optic gain. Referring to Fig. 3 it will be noted that the double convex lens L has a focal length F.L. Normally the photosensitive area 55 would be located in the focal plane F of the lens to obtain optimum optic gain. But the focus of the lens will move a distance $d$ as the angle of incidence $A_o$ of light from a remote source $S_o$ changes, i.e.

$$d = F.L. \cdot \tan A_o$$

Thus for a focal length of two inches and $A_o = 10°$, $d = 0.35$ inch. Since this distance exceeds the $\frac{3}{16}'' \times \frac{5}{64}''$ sensitive area in length and width, the focus of the lens would move off the sensitive area. To avoid this condition the optic system of the present invention employs two lenses 22 and 44 as shown in Figs. 2 and 4. Lens 22 may be a simple double convex lens. This lens serves as the light collector. Lens 44 is a semicylindrical flat lens. It may be formed from a section of a plastic or glass rod if desired. Lens 44 may be placed between the focus or focal point $F_o$ of lens 22 and the lens 22 itself. Area 55 may be located at focus $F_o$ or preferably between focus $F_o$ and lens 44. The flat sides 43 of lens 44 will be horizontal, i.e. the geometric axis Y will be vertical. The length of rectangular area 55 will be horizontal. Thus in a horizontal plane parallel to the aligned axes O, X' of lenses 22 and 44 there is a new focal length for the system which is less than the focal length of lens 22 taken alone. Lens 44 concentrates all the light passing through lens 22 on area 55. An intensely illuminated image of the remote light source will be formed on area 55 consisting of a narrow slit-like line I as shown best in Fig. 5.

The image I will move across and up and down the substantially rectangular sensitive area 55 with the received light as indicated in Fig. 6 as the remote light source S approaches the lens system 22, 44. The several extreme positions which may be assumed by image I are listed below and shown in Fig. 6.

| Image position: | Acceptance angle |
|---|---|
| 1A | Maximum right horizontal angle.<br>Maximum up vertical angle. |
| 1B | Zero horizontal angle.<br>Maximum up vertical angle. |
| 1C | Maximum left horizontal angle.<br>Maximum up vertical angle. |
| 2A | Maximum right horizontal angle.<br>Zero vertical angle. |
| 2B | Zero horizontal angle.<br>Zero vertical angle. |
| 3A | Maximum right horizontal angle.<br>Maximum down vertical angle. |
| 3B | Zero horizontal angle.<br>Maximum down vertical angle. |
| 3C | Maximum left horizontal angle.<br>Maximum down vertical angle. |

The length of image I is determined by the focal length of lens 22. The width of image I is determined by the focal length of lens 44. This situation remains the same if lens 44 and area 55 are located beyond focus $F_0$. If area 55 is located exactly at focus $F_0$ then lens 44 must be rotated 90° so that axis Y is horizontal. Then the length of image I will be determined by lens 44 and the width of image I will be determined by lens 22.

The exact length and motion of the image line is a function of the following parameters:

(1) Focal length of lens 22.
(2) Focal length of lens 44.
(3) Distance $d_1$.
(4) Distance $d_2$.

Distance $d_1$ is the distance between the optic center O' of lens 22 and the geometric axis Y of lens 44. Distance $d_2$ is the distance from the geometric axis Y of lens 44 to the photosensitive area 55.

In a practical design of the optic system described above, lens 22 may be a double convex spherical lens 29 mm. in diameter with a focal length ($O'-F_0$) of 45 mm. Lens 44 may be a cylindrical segment having a diameter of 19 mm. with a focal length of 9.5 mm. The distance $d_1$ may be approximately 31 mm. and distance $d_2$ may be approximately 3.2 mm.

In this system, arranged as shown in Fig. 4 the length of the image I and hence the vertical acceptance angle for photosensitive area 55 is a critical function of distance $d_1$ where $d_2$ is fixed, whereas the horizontal acceptance angle is not a critical function of distance $d_1$. Thus by varying distance $d_1$ an almost independent adjustment of the vertical acceptance angle may be obtained. If the optical system employed a single compound lens 22 which had both spherical and cylindrical surfaces, the adjustment for vertical acceptance angle would not be independent of the adjustment for horizontal acceptance angle.

In the device shown in Figs. 1 and 2, the optic assembly in its enclosure 20 may be mounted above the dashboard and behind the windshield of a vehicle if the system is intended to be responsive to a headlight or taillight of another vehicle.

The conventional automobile has a cowl which is generally curved. Thus it is necessary to provide for rotation of the optic system, for vertical alignment and for horizontal alignment. In the device shown in Figs. 1 and 2, rotating the cylindrical support member 37 rotates the cylindrical lens 44 and photocell 50. The photocell with its rectangular photosensitive area 55 is rotatable independently of lens 44 within disk 46 and is axially adjustable therein. Photocell 50 is movable within disk 46 to accomplish the desired adjustments. Set screw 40 is tightened in member 37 to fix the position of the photocell and lens 44 assembly in tube 20. Lens 22 is movable along its optical axis by means of set screw 25 and slot 24. A set screw 46' extended through an oblique bore in disk 46 may be used to hold the photocell in position. The set screw is reached by unscrewing disk 41. Vertical alignment of the optical system is accomplished by loosening nut 30 and bolt 31 which is inserted in slot 27A and moving the tube 20 vertically up or down and then tightening the nut and bolt. Horizontal alignment is accomplished by loosening the nut 33 on screw 34 and rotating the unit above a vertical axis to the desired position. The nut 33 is then tightened. Lead wires 51, 52 are passed out of the rear of the tube 20 through end plate 38.

The long axis of the photosensitive area 55 is positioned at right angles to the aligned optical axes of the lens 22 and cylindrical lens 44. If desired lens 43 could be angularly adjustable in aperture 42 with respect to the photosensitive area 55 of the adjacent photocell.

The assembly of Figs. 1, 2 is a compact optic-photoelectric pick-up unit. It should be used with an electronic control circuit C appropriate to the characteristics of the particular photoelectric cell employed in the assembly. A suitable controlled device D may be the headlight of a vehicle, a visible or audible alarm, a solenoid, etc.

It is preferred according to the invention that photocells employing semiconductor types of photosensitive elements be used. Suitable elements may be crystals of cadmium sulphide, cadmium selenide, and the like. Photocells which have a high sensitivity to incident red light are preferred for systems which must respond to red tail lights of vehicles. The semi-conductor elements change electrical conductivity as the intensity of light impinging upon them changes. In the photosensitive area 55 shown in Fig. 5, the image I will normally extend across the rectangular area from top to bottom and overlap slightly on to the electrodes 56, 57. If one end of image I terminates on the area 55 leaving an unilluminated gap between image I and the adjacent electrode a high resistance path amounting to hundreds of megohms exists in the gap. The system is so arranged that this underlap of the image with respect to the electrodes occurs whenever the light from the distant source is approaching at an angle greater than the predetermined maximum vertical acceptance angle. An abrupt change in conductivity is obtained whenever the incident vertical light angle becomes excessive. As long as the image I extends fully across the sensitive area 55 shown in Fig. 6 a minimum electrical resistivity amounting to a few megohms exists. For horizontal movement of the image I, a similar situation exists. When image I is located between the extreme right and left positions shown respectively in areas 1C, 2C, 3C and 1A, 2A, 3A resistivity of the photocell is minimum. If the image moves beyond these extreme positions all or part of the image falls outside of the sensitive area 55, then electrical resistance abruptly rises as the extreme positions are passed. This occurs when the distant light source is so located that the horizontal incident light angle exceeds the predetermined maximum horizontal acceptance angle.

The optic system in conjunction with the photoconductive element thus operates between sharply defined vertical and horizontal light acceptance angles. Any light which arrives at the photocell from directions defining greater angles than the predetermined horizontal and vertical acceptance angles is ineffective to actuate the control circuit associated with the photocell because the very high resistance of the photosensitive element existing when the element is not illuminated remains substantially unchanged. As soon as the slit-like image falls on the rectangular area 55 and extends completely across it, the electrical resistance of the photocell decreases abruptly to actuate the associated control circuit.

In general photoelectric cells of the photoconductive type mentioned have an inherent time constant or time lag in operation which is characteristic of the photosensitive material. In order to meet the speed of operation requirement of the control system, the electronic circuit associated with the electro-optical assembly should be adapted to the time constant of the photocell.

The circuit shown in Fig. 2 is a circuit which operates with a photocell 50 whose time lag or time constant is short compared with the required speed of operation of the system. The circuit includes a tetrode 60 having a space charge grid 61 arranged for low voltage operation. Relay 70 has its coil 65 connected in the circuit of plate 66. The relay has a movable contact 67 and fixed contacts 68, 71 also connected in the plate circuit. A bias resistor 74 having a low resistance value is connected in the circuit of cathode 63 to reduce the plate current to a nominally low value insufficient to operate the relay. There is very little degeneration introduced by resistor 74 since it has a low resistance value. The current through the resistor being due principally to that drawn by the space charge grid 61. The input circuit includes a voltage dropping resistor 75, the photosensitive element 55 of photocell 50, and load resistors 76 and 77 all connected in series across the D.C. voltage supply provided at terminals 78, 79. The arrangement is such that when relay 70 is deenergized contacts 67, 68 are closed and load resistor 77 is shorted out of the circuit. The voltage across the load resistors is applied to the control grid 62 of the tube. In the absence of illumination the photoelectric cell has a very high electrical resistance and a negligibly small current flows through the load resistor 76 so that a negligible positive voltage is applied to the grid 62. When an appropriate level of illumination is applied to the photocell, depending on the value of resistance 76 a sufficient positive signal will be applied at the control grid 62 to increase the current through the tube 60 and relay 70 will be actuated to cause contacts 67, 71 to close. When the relay closes, the short circuit across resistor 77 is removed and the effective load resistance becomes the sum of the individual resistors 76 and 77. Then as the illumination of the photocell is reduced from the value required to trip the relay initially, the relay will remain closed until the illumination drops to a value determined by the sum of resistors 76, 77 at which value, the relay will reopen. Thus the intensities of illumination at which the relay 70 opens and closes may be predetermined by the individual settings of resistors 76 and 77. Switch 80 is provided to remove the D.C. voltage from the photocell and load resistors when it is closed since the negative D.C. voltage terminal will then be shifted to terminal 81.

When relay 70 becomes energized so that contacts 67, 71 close, relay 82 becomes energized and contacts 83, 84 close. This causes the power supply circuit for lamps 85 to be completed and the lamps light. When contacts 83, 84 close, contacts 83, 87, which are normally closed, open to break the power supply circuit for lamps 88. Lamps 88 may be high beam or high powered headlamps or filaments in the headlamps of a vehicle and lamps 85 may be the low beam or low powered headlamps or filaments in the headlamps of a vehicle. When relay 70 becomes deenergized, relay 82 also becomes deenergized and the power supply circuit for lamps 88 is restored while the power supply of lamps 85 is again interrupted.

As mentioned above photoconductive cells generally have a time constant or time lag which is characteristic of the particular photosensitive material employed. The frequency response characteristics of such photocells to modulated light is such that the response falls off approximately six db per octave with increasing frequency.

It has been noted that this falling frequency response characteristic is essentially the same as a low-pass resistance-capacitance network. It is possible to compensate for this falling response characteristic by use of a network having a rising frequency response characteristic of six db per octave above a given frequency depending upon the time constant of the equivalent resistance-capacitance network of the photocell. Compensation may be achieved then by employing a single, high-pass RC network whose time constant is equal to that of the photocell.

Figure 7:
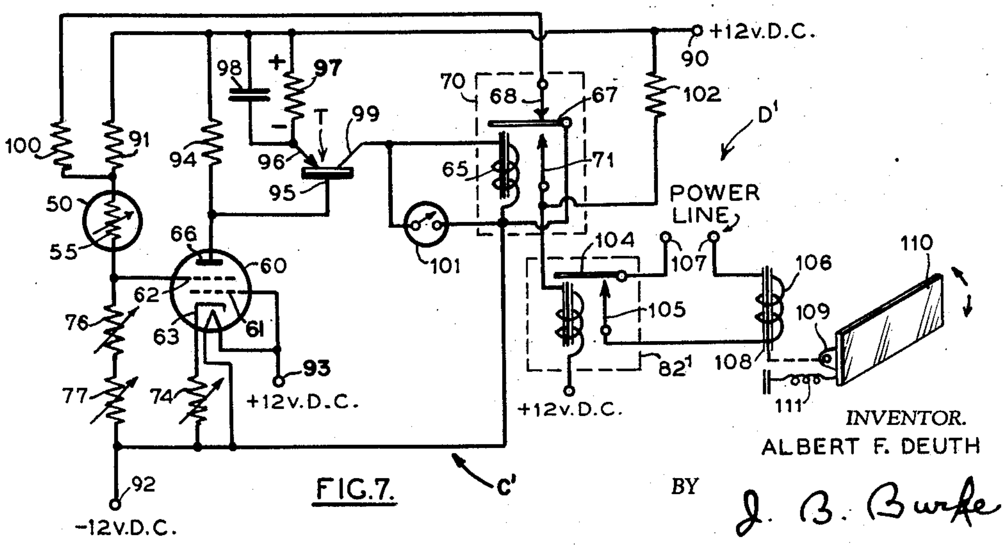
Fig. 7 is a diagram of another electronic circuit usable in the system.

Fig. 7 is a circuit providing such compensation for the time constant of a photocell 50 having photoconductive element 55. The photocell 50 is connected to D.C. voltage source at terminal 90 via resistor 91. The photocell is in series with load resistors 76, 77 which are connected to the other D.C. voltage terminal 92. One of the resistors 76, 77 may be a gross adjustment and the other may be a fine or vernier adjustment available to the operator of the vehicle in which the system is installed. The output voltage appearing across resistors 76, 77 is applied to the control grid 62 of the tetrode 60. This tube contains a space charge grid 61 connected to D.C. voltage terminal 93. In the circuit of cathode 63 is a resistor 74 which can be adjusted to bias the tube nearly to cut-off in the absence of illumination on the element 55 of the photocell. The output signal of the tube 60 appears across plate load resistor 94 which is connected in the circuit of plate 66. The voltage across plate load resistor 94 is applied to the base 95 of a transistor T. This is a PNP type of transistor. The emitter 96 of the transistor is connected through a degeneration resistor 97 to the positive voltage supply terminal 90. The resistor 97 is shunted by a frequency response equalizing capacitor 98. Collector 99 of the transistor is connected through coil 65 of relay 70 to the negative terminal 90 of the D.C. voltage source.

Due to the high degeneration provided by the resistor 97 at the emitter, the transistor circuit provides a low gain at D.C. with a rising frequency response which rises about six db per octave with increasing frequency above a frequency determined by the time constant of the R-C combination of resistor 97 and capacitor 98, to an upper frequency limit determined by the maximum gain available from the transistor without degeneration. If the time constant of elements 97, 98 is adjusted to equal that of the photocell the desired compensation is obtained. The contacts of relay 70 are connected so that the voltage applied to the photocell at terminal 90 is dependent upon whether or not the relay is actuated and contacts 67, 68 or 67, 71 are open or closed. With no illumination on the photocell 50, the relay will not be actuated and contacts 67, 68 will be closed. The voltage applied at the photocell will depend upon the resistors 76, 77. As the illumination applied to the photocell is increased, a value dependent upon the load resistors 76, 77 will be reached at which the relay 70 will be actuated and contacts 67, 71 will close. When the relay closes the shunting effect of resistor 100 which is connected between contact 68 and the photocell, will be removed and the voltage applied to the photocell will rise substantially to the full D.C. supply voltage. Thus the voltage output for a given illumination which is applied to grid 62 will increase. As the illumination on the photocell is decreased, the relay contacts 67, 71 remain closed until at a lower intensity of illumination the relay contacts 67, 71 open. The ratio of the intensities of illumination at which the relay 70 will open and close is set by the ratio of the values of resistors 91 and 100. These ratios remain constant and independent of the settings of the load resistors 76, 77. Switch 101 is connected across coil 65 of relay 70 to short the relay coil and prevent operation of the relay when it is desired to disable the system. Contact 71 of relay 70 is connected to the coil of relay 82' which serves to open and close contacts 104, 105. The resistor 102 which is connected to the coil of relay 82 and to contact 71 prevents arcing at the contacts 67, 71 when the inductive load circuit presented by the power relay 82' is interrupted.

The control circuit C' in Fig. 7 is shown controlling a load device D' which includes a solenoid 106 connected to power line terminals 107. The plunger 108 is used to tilt a mirror 110 which may be the rear view mirror of an automobile. The mirror pivots at 109 against the tension in a spring 111. If the optical assembly is located on the rear window platform of an automobile, the system may serve as an anti-glare apparatus to tilt the mirror whenever an approaching vehicle directs its headlights into the rear window of the vehicle in which the system is installed. It is possible to dispose the system in a stationary position at a road sign to switch on lamps such as lamp 85 when a vehicle approaches and its headlights illuminate the photocell. Other applications and uses for the system will readily occur to those skilled in the art.

What is claimed and sought to be protected by Letters Patent of the United States is:

1. In a light responsive control system, the combination comprising a photoconductive cell having a substantially rectangular photosensitive area, and a lens system consisting of a collector lens and a uniplanar converging lens having their optic axes disposed in optical alignment with said area for receiving light from a distant moving light source, said area being spaced a fixed distance from lens system, said lens system casting a slit-like image of said light source on said area, said image having a length greater than the width of said area, said image being movable laterally and longitudinally over said area as said light source moves, said area providing a variable resistance in said system, said resistance being low only when said image extends completely across said area, said combination having predetermined maximum lateral and longitudinal light acceptance angles wherein said image extends completely across said area, said variable resistance increasing abruptly when the light source moves to a position where the image extends incompletely across the area, said maximum lateral light acceptance angle being determined by the length of said area, said longitudinal light acceptance angle being determined by the length of said image with respect to the width of said area.

2. In a light responsive control system the combination comprising a photoconductive cell having a substantially rectangular photosensitive area, and a lens system consisting of a light collector lens and a uniplanar light converging lens having an optic axis disposed in optic alignment with said area for receiving light from a distant moving light source, said lens system being spaced a fixed distance from said area and casting a slit-like image of said light source on said area, said image having a length greater than the width of said area, said image being movable laterally and longitudinally over said area as the light source moves, said area providing a variable electrical resistance in said system, said resistance being minimum when said image extends completely across said area and being higher when said image extends incompletely across said area, said image extending completely across said area only when the light from said source approaches from directions falling within predetermined maximum vertical and horizontal light acceptance angles with respect to said optic axis, said variable resistance changing abruptly from low to high values when light received from said source moves to approach the lens system at angles greater than said predetermined maximum angles, said maximum vertical light acceptance angle being determined by the length of said image with respect to the width of said area, said horizontal light acceptance angle being determined by the length of said area.

3. In a control system, a device responsive to light received from an approaching light source, comprising in combination a cylindrical casing open at one end thereof, a photoelectric cell disposed in the casing, said cell having a substantially rectangular photoconductive area defined between spaced electrode and exposed to said open end of the casing, an optical system consisting of a collector lens and a cylindrically curved lens disposed in the casing between said open end and said photoconductive area, said cylindrically curved lens being a uniplanar light converging element to focus light received from said collector lens as a slit-like image on said area, said image extending in the direction of its length across the width of said area, the length of said image being constant and greater than the width of said area, said lens having its optic axis disposed perpendicular to said area, said image being subject to move in the direction of its length on the area when the vertical angle between said optic axis and the direction of approach of light from said source varies, said area providing an electrical path of minimum resistance between said electrodes when said image extends completely across said area and further providing a high resistance gap between said electrodes when said image extends incompletely across the area, the length of said image with respect to the width of said area determining the maximum vertical angle of light acceptable from said source to produce the minimum resistance path across the area, said image being further subject to move in the direction of its width on and off the area when the area is substantially vertical and as the horizontal angle between said optic axis and the direction of approach of light from said source varies, said path having a lower electrical resistance when said image is on the area than when the image is off the area, the length of said area determining the maximum horizontal angle of light acceptable from said source to produce said lower electrical resistance.

4. A device responsive to light received from an approaching light source for controlling headlights in a vehicle, comprising in combination: a photoconductive cell having a substantially rectangular photosensitive area defined between spaced electrodes, and an optical system consisting of a collector lens and a semicylindrical lens disposed between said source and said area and located a fixed distance from said area with its optic axis disposed perpendicular to said area, said semicylindrical lens focusing the light received from said source and transmitted through said collector lens as a slit-like image on said area, said image having a constant length and extending in the direction of its length across the width of said area, the length of said image being greater than the width of said area between said electrodes, said image being subject to move in the direction of its length on the area when the plane of said area is substantially vertical and as the vertical angle between said optic axis and the direction of approach of light from said source varies, said area providing an electrical path of minimum resistance when said image extends completely across said area and providing a high resistance gap between the electrodes when said image extends incompletely across the area, the excess in width of said image with respect to the width of said area determining the maximum vertical angle of light acceptable from said source to produce the minimum resistance path across the area, said image being further subject to move in the direction of its width on and off the area when the area is substantially vertical and as the horizontal angle between said optic axis and the direction of approach of light from said source varies, said area having a lower electrical resistance when said image is on the area than when the image is off the area, the length of said area determining the maximum horizontal angle of light acceptable from said source to produce said lower electrical resistance.

5. In a control system, a device responsive to light received from an approaching light source, comprising in combination a casing open at one end thereof, a photoelectric cell disposed in the casing and having a substantially rectangular photoconductive area exposed to said open end of the casing, and a lens system consisting of a light collector lens and a uniplanar light converging lens disposed in the casing between said open end and said photoconductive area to focus light received from said source as a slit-like image on said area, said image extending in the direction of its length across the width of said area, the length of said image being constant and greater than the width of said area, said lens having its optic axis disposed perpendicular to said area, said image being subject to move in the direction of its length on the area when the vertical angle between said optic axis and the direction of approach of light from said source varies, said area providing an electrical path of minimum resistance between said electrodes when said image extends completely across said area and further providing a high resistance gap between said electrodes when said image extends incompletely across the area, the excess in length of said image with respect to the width of said area determining the maximum vertical angle of light acceptable from said source to produce the minimum resistance path across the area, said image being further subject to move in the direction of its width on and off the area when the area is substantially vertical and as the horizontal angle between said optic axis and the direction of approach of light from said source varies, said path having a lower electrical resistance when said image is on the area than when the image is off the area, the length of said area determining the maximum horizontal angle of light acceptable from said source to produce said lower electrical resistance said area being responsive primarily to red light rays emitted by said source.

6. In a control system, a device responsive to light received from an approaching light source, comprising in combination a casing open at one end thereof, a photoelectric cell disposed in the casing and having a substantially rectangular photoconductive area defined between spaced electrodes exposed to said open end of the casing, and an optical system consisting of a light collector and a semicylindrical lens disposed in the casing between said open end and said photoconductive area to focus light received from said source as a slit-like image on said area, said image extending in the direction of its length across the width of said image, the length of said image being constant and greater than the width of said area, said lens having its optic axis disposed perpendicular to said area, said image being subject to move in the direction of its length on the area when the vertical angle between said optic axis and the direction of approach of light from said source varies, said area providing an electric path of minimum resistance between said electrodes when said image extends completely across said area and further providing a high resistance gap between said electrodes when said image extends incompletely across the area, the length of said image with respect to the width of said area determining the maximum vertical angle of light acceptable from said source to produce the minimum resistance path across the area.

7. A device responsive to light received from an approaching light source, comprising in combination: a substantially rectangular photoconductive surface disposed between spaced electrodes, a first double convex lens disposed to collect light from said light source, and a second semicylindrical lens having a flat rectangular side and semicircular end faces disposed to receive all of said collected light and focus the received light as a slit-like illuminated area upon said surface, said area extending in the direction of its length across the width of said surface, said length being greater than the width of said surface, the first and second lenses having aligned optic axes disposed perpendicular to said surface, said illuminated area being subject to move on the surface when the angle between said optic axes and the direction of approach of light from said source taken in any plane changes, said surface providing an electrical path thereacross having a minimum electrical resistance when said illuminated area extends completely across the surface, said resistance changing abruptly to a maximum value when said illuminated area moves to extend incompletely across said surface, the excess in length of said area with respect to the width of said surface determining the maximum angle of light acceptable from said source taken in a plane including said optic axes, direction of approach of light from said source and lengthwise direction of extension of said area.

8. A device responsive to light received from an approaching light source, comprising in combination: a substantially rectangular photoconductive surface disposed between spaced electrodes, and an optical system consisting of first and second lenses, the first lens disposed to collect light from said light source, and the second lens disposed to receive all of said collected light and concentrate the received light as a slit-like intensely illuminated area upon surface, said area extending in the direction of its length across the width of said surface, the first and second lenses having aligned optic axes disposed perpendicular to said surface, said illuminated area being subject to move on the surface when the angle between said optic axes and the direction of approach of light from said source taken in any plane changes, said surface providing an electrical path thereacross having a minimum electrical resistance when said illuminated area extends completely across the surface, said resistance changing abruptly to a maximum value when said illuminated area moves to extend incompletely across said surface, the length of said area with respect to the width of said surface determining the maximum angle of light acceptable from said source taken in a first plane including said optic axes, direction of approach of light from said source and lengthwise direction of extension of said area, the length of said surface determining the maximum angle of light acceptable from said source taken in another plane including said optic axes, direction of approach of light from said source and lengthwise direction of extension of said surface.

9. A device responsive to light received from an approaching light source, comprising in combination, a substantially rectangular photoconductive surface, and a lens system consisting of a double convex lens and a partially cylindrical lens disposed to receive light from said source and focus the received light as a slit-like illuminated area upon said surface, said area extending in the direction of its length across the width of said surface, said length being greater than the width of said surface, said lens system having its optic axis disposed substantially perpendicular to said surface, said illuminated area being subject to move on the surface when the angle between said optic axis and the direction of approach of light from said source taken in any plane changes, said surface providing an electrical path thereacross having a minimum electrical resistance when said illuminated area extends completely across the surface, said resistance changing to a maximum value abruptly when said illuminated area moves to extend incompletely across said surface, the length of said area with respect to the width of said surface determining the maximum angle of light acceptable from said source taken in a plane including said optic axis, direction of approach of light from said source and direction of the extension of said area, the length of said surface determining the maximum angle of light acceptable from said source taken in another plane including said optic axis, direction of approach of light from said source and lengthwise direction of extension of said surface.

10. A light responsive device comprising in combination: a photosensitive cell, said cell having a substantially rectangular photoconductive surface with spaced electrodes thereon, and an optical system consisting of a light collecting lens and a semicylindrical lens, said semicylindrical lens being disposed between the collecting lens and said surface, said surface being disposed perpendicular to aligned optic axes of the lenses, said semicylindrical lens focusing all the light passing through the collecting lens as a slit-like image on said surface, the length of said image exceeding the spacing of said electrodes, the length and width of said surface and the spacing of said lenses with respect to each other and to said surface solely determining light acceptance angles of the device in mutually perpendicular planes perpendicular to said surface.

References Cited in the file of this patent

UNITED STATES PATENTS

| | | |
|---|---|---|
| 1,406,445 | Culver | Feb. 14, 1922 |
| 1,629,727 | Murray | May 24, 1927 |
| 1,896,830 | Scharff | Feb. 7, 1933 |
| 1,983,882 | Rosenfeld | Dec. 11, 1934 |
| 2,075,094 | Chubb | Mar. 30, 1937 |
| 2,548,783 | Goldsmith | Apr. 10, 1951 |
| 2,614,227 | Bordewieck et al. | Oct. 14, 1952 |
| 2,641,712 | Kircher | June 9, 1953 |
| 2,688,564 | Forgue | Sept. 7, 1954 |
| 2,730,654 | Rabinow | Jan. 10, 1956 |
| 2,753,487 | Bone | July 3, 1956 |
| 2,762,932 | Falge et al. | Sept. 11, 1956 |
| 2,771,594 | Gourdou | Nov. 20, 1956 |
| 2,795,736 | Dilks | June 11, 1957 |